(12) United States Patent
Mehrotra et al.

(10) Patent No.: US 7,321,283 B2
(45) Date of Patent: Jan. 22, 2008

(54) VERTICAL WINDING STRUCTURES FOR PLANAR MAGNETIC SWITCHED-MODE POWER CONVERTERS

(75) Inventors: Vivek Mehrotra, Newbury Park, CA (US); Jian Sun, Clifton Park, NY (US); Sriram Chandrasekaran, Burbank, CA (US)

(73) Assignee: ColdWatt, Inc., Austin, TX (US)

( * ) Notice: Subject to any disclaimer, the term of this patent is extended or adjusted under 35 U.S.C. 154(b) by 0 days.

(21) Appl. No.: 10/922,066

(22) Filed: Aug. 19, 2004

(65) Prior Publication Data

US 2006/0038650 A1 Feb. 23, 2006

(51) Int. Cl.
*H01F 5/00* (2006.01)

(52) U.S. Cl. .................................................. 336/200

(58) Field of Classification Search .................. 336/65, 336/83, 84 R, 84 C, 178, 200, 232
See application file for complete search history.

(56) References Cited

U.S. PATENT DOCUMENTS

| | | | |
|---|---|---|---|
| 1,376,978 A | 5/1921 | Stoekle |
| 3,358,210 A | 12/1967 | Grossoehme |
| 3,433,998 A | 3/1969 | Woelber |
| 3,622,868 A | 11/1971 | Todt |
| 3,681,679 A | 8/1972 | Chung |
| 3,708,744 A | 1/1973 | Stephens et al. |
| 4,019,122 A | 4/1977 | Ryan |
| 4,075,547 A | 2/1978 | Wroblewski |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,636,823 A | 1/1987 | Margalit et al. |
| 4,660,136 A | 4/1987 | Montorefano |
| 4,823,249 A | 4/1989 | Garcia, II |
| 4,887,061 A | 12/1989 | Matsumura |
| 4,899,271 A | 2/1990 | Seiersen |
| 4,903,089 A | 2/1990 | Hollis et al. |
| 4,999,759 A | 3/1991 | Cavagnolo et al. |

(Continued)

FOREIGN PATENT DOCUMENTS

JP 2000-68132 3/2000

OTHER PUBLICATIONS

Xu, et al., Design of 48V Voltage Regulator Modules with a Novel Integrated Magnetics, IEEE Transactions on Power Electronics, vol. 17, No. 6 (Nov. 2002), pp. 990-998.

(Continued)

*Primary Examiner*—Tuyen T. Nguyen
(74) *Attorney, Agent, or Firm*—Slater & Matsil, L.L.P.

(57) ABSTRACT

A vertical winding structure for planar integrated magnetics used in switched-mode power converters maintains close coupling between the different windings but reduces the eddy current losses, lowers the DC winding resistance and reduces the number of layers of the PCB. Vertical and horizontal windings can be used together without sacrificing these performance advantages and further minimizing the capacitive coupling between the outer-leg windings and the center-leg winding. This winding structure can be used in a wide range of magnetic structures including isolated and non-isolated CDRs, interleaved CDRs, and buck and boost converters.

19 Claims, 6 Drawing Sheets

U.S. PATENT DOCUMENTS

| | | |
|---|---|---|
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,206,621 A | 4/1993 | Yerman |
| 5,223,449 A | 6/1993 | Morris et al. |
| 5,231,037 A | 7/1993 | Yuan et al. |
| 5,244,829 A | 9/1993 | Kim |
| 5,291,382 A | 3/1994 | Cohen |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,369,042 A | 11/1994 | Morris et al. |
| 5,374,887 A | 12/1994 | Drobnik |
| 5,407,842 A | 4/1995 | Morris et al. |
| 5,468,661 A | 11/1995 | Yuan et al. |
| 5,508,903 A | 4/1996 | Alexndrov |
| 5,554,561 A | 9/1996 | Plumton |
| 5,555,494 A | 9/1996 | Morris |
| 5,610,085 A | 3/1997 | Yuan et al. |
| 5,624,860 A | 4/1997 | Plumton et al. |
| 5,663,876 A | 9/1997 | Newton et al. |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,386 A | 9/1998 | Gordon |
| 5,870,299 A | 2/1999 | Rozman |
| 5,886,508 A | 3/1999 | Jutras |
| 5,889,298 A | 3/1999 | Plumton et al. |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,933,338 A | 8/1999 | Wallace |
| 5,956,245 A | 9/1999 | Rozman |
| 5,956,578 A | 9/1999 | Weitzel et al. |
| 5,999,066 A | 12/1999 | Saito et al. |
| 6,008,519 A | 12/1999 | Yuan et al. |
| 6,011,703 A | 1/2000 | Boylan et al. |
| 6,038,154 A | 3/2000 | Boylan et al. |
| 6,069,799 A | 5/2000 | Bowman et al. |
| 6,084,792 A | 7/2000 | Chen et al. |
| 6,094,038 A | 7/2000 | Lethellier |
| 6,097,046 A | 8/2000 | Plumton |
| 6,156,611 A | 12/2000 | Lan et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,309,918 B1 | 10/2001 | Huang et al. |
| 6,320,490 B1 * | 11/2001 | Clayton ............... 336/180 |
| 6,323,090 B1 | 11/2001 | Zommer |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,414,578 B1 | 7/2002 | Jitaru |
| 6,477,065 B2 | 11/2002 | Parks |
| 6,483,724 B1 | 11/2002 | Blair et al. |
| 6,489,754 B2 | 12/2002 | Blom |
| 6,501,193 B1 | 12/2002 | Krugly |
| 6,512,352 B2 | 1/2003 | Qian |
| 6,525,603 B1 | 2/2003 | Morgan |
| 6,539,299 B2 | 3/2003 | Chatfield et al. |
| 6,549,436 B1 | 4/2003 | Sun |
| 6,661,276 B1 | 12/2003 | Chang |
| 6,683,797 B2 | 1/2004 | Zaitsu et al. |
| 6,696,910 B2 | 2/2004 | Nuytkens et al. |
| 6,741,099 B1 | 5/2004 | Krugly |
| 6,765,810 B2 | 7/2004 | Perry |
| 6,775,159 B2 | 8/2004 | Webb et al. |
| 6,867,678 B2 | 3/2005 | Yang |
| 6,873,237 B2 | 3/2005 | Chandrasekaran et al. |
| 6,980,077 B1 | 12/2005 | Chandrasekaran et al. |
| 7,012,414 B1 | 3/2006 | Mehrotra et al. |
| 7,046,523 B2 | 5/2006 | Sun et al. |
| 7,076,360 B1 | 7/2006 | Ma |
| 2002/0114172 A1 | 8/2002 | Webb et al. |
| 2003/0197585 A1 | 10/2003 | Chandrasekaran et al. |
| 2003/0198067 A1 | 10/2003 | Sun et al. |
| 2005/0024179 A1 | 2/2005 | Chandrasekaran et al. |
| 2006/0038549 A1 | 2/2006 | Mehrotra et al. |
| 2006/0038649 A1 | 2/2006 | Mehrotra er al. |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0255360 A1 | 11/2006 | Brar et al. |

OTHER PUBLICATIONS

U.S. Appl. No. 11/211,964, filed Aug. 25, 2005, Brar et al.
U.S. Appl. No. 11/236,376, filed Sep. 27, 2005, Chandrasekaran et al.
Eisenbeiser, K., et al., "Manufacturable GaAs VFET for Power Switching Applications," IEEE Electron Device Letters, Apr. 2000, pp. 144-145, vol. 21, No. 4, IEEE.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Kollman, R., et al., "10 MHz PWM Converters with GaAs VFETs," IEEE Eleventh Annual Applied Power Electronics Conference and Exposition, Mar. 1996, pp. 264-269, vol. 1, IEEE.
Liu, W., "Fundamentals of III-V Devices: HBTs, MESFETs, and HFETs/HEMTs," §5-5: Modulation Doping, 1999, pp. 323-330, John Wiley & Sons, New York, NY.
Nguyen, L.D., et al., "Ultra-High Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual, IEEE Power Electronics Specialists Conference, Jun. 1996, pp. 861-867, vol. 1, IEEE.
Plumton, D.L., et al., "A Low On-Resistance High-Current GaAs Power VFET," IEEE Electron Device Letters, Apr. 1995, pp. 142-144, vol. 16, No. 4, IEEE.
Weitzel, C.E., "RF Power Devices for Wireless Communications," 2002, 2002 IEEE MTT-S CDROM, paper TU4B-1, IEEE.
Williams, R., "Modern GaAs Processing Methods," 1990, pp. 66-67, Artech House, Inc., Norwood, MA.

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

"AN100: Application Note using Lx100 Family oh High Performance N-Ch JFET Transistors," Sep. 2003, 5 pp., Lovoltech, Inc., Santa Clara, Ca.

"AN101A: Gate Drive Network for a PowerJFET," Nov. 2003, 2 pp., Lovoltech, Inc., Santa Clara, CA.

"AN108: Applications Note: How to Use Power JFETs® and MOSFETs Interchangeably in Low-Side Applications," Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEE, Los Alamitos, CA.

Gaye, M., et al., "A 50-100 MHz 5 V to -5 V, 1 W Cuk Converter Using Gallium Arsenide Power Switches," ISCAS 2000 - IEEE International Symposium on Circuits and Systems, May 2000, pp. I-264-I-267, vol. 1, IEEE, Geneva, Switzerland.

Jitaru, I.D., et al., "Quasi-Integrated Magnetic An Avenue for Higher Power Density and Effciency in Power Converters," Twelfth Annual Applied Power Electronics Conference and Exposition, Feb. 23-27, 1997, pp. 395-402, vol. 1, IEEE, Los Alamitos, CA.

Lee, P.-W., et al., "Steady-State Analysis of an Interleaved Boost Converter with Coulped Inductors," IEEE Transactions on Industrial Electronics, Aug. 2000, pp. 787-795, vol. 47, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Converstion (HFPC '91) Conference, Jun. 1991, pp. 236-243, Toronto, CA.

Pietkiewicz, A., et al. "Coupled-Inductor Current-Doubler Topology on Phase-Shifted Full-Bridge DC-DC Converter," Proceedings of INTELEC '98, 1998, 9 pp., Paper 2-3, IEEE, Los Alamitos, CA.

Rajeev, M., "An Input Current Shaper with Boost and Flyback Converter Using Integrated Magnetics," Power Electronics and Drive Systems, Fifth International Conference on Power Electronics and Drive Systems 2003, Nov. 17-20, 2003, pp. 327-331, vol. 1, IEEE, Los Alamitos, Ca.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Xu, P., et al., A Family of Novel Interleaved DC/DC Converters for Low-Voltage High-Current Voltage Regulator Module Applications, IEEE Power Electronics Specialists Conference, Jun. 2001, pp. 1507-1511 IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Zhou, X., et al., "A High Power Density, High Effciency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Invetigation of Candidate VRM Topologies for Future Microprocessors," IEEE Applied Power Electronics Conference, Mar. 1998, pp. 145-150, IEEE, Los Alamitos, CA.

* cited by examiner

VERTICAL WINDING STRUCTURES FOR PLANAR MAGNETIC SWITCHED-MODE POWER CONVERTERS

BACKGROUND OF THE INVENTION

1. Field of the Invention

This invention relates to planar integrated magnetics and more specifically to vertical winding structures for planar integrated magnetic switched-mode power converters.

2. Description of the Related Art

Power converters are key components in many military and commercial systems and they often govern size and performance. Power density, efficiency and reliability are key characteristics used to evaluate the characteristics of power converters. Transformers and inductors used within these power converters may be large and bulky and often limit their efficiency, power density and reliability. These deficiencies can be improved by using a high frequency "switch-mode" architecture instead of a traditional step-down configuration and by replacing conventional core-and-coil designs with "planar magnetics."

Planar magnetics offer several advantages, especially for low-power dc-dc converter applications, such as low converter profile, improved power density and reliability, reduced cost due to the elimination of discrete magnetic components, and close coupling between different windings. For example, the integrated magnetics 10 shown in FIG. 1 for a current-doubler rectifier (CDR) comprises an E-core 12 and plate 14 wound with split-primary windings 16 and 18, secondary windings 20 and 22, and an inductor winding 24 (See U.S. Pat. No. 6,549,436). This type of core arrangement is referred to as an E-I core. Other core geometries, for example circular core legs, are also possible. The windings perform the functions of both the transformer and the two inductors used in the CDR. The center-leg winding is used to increase the effective filtering inductance and carries the full load current all the time. Gapping of the center leg is typically done to prevent core saturation.

Figure 2A:
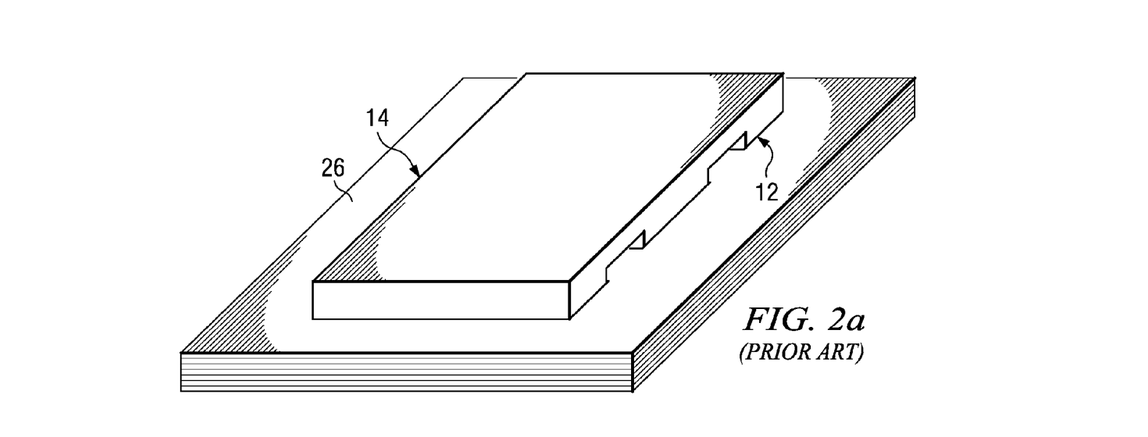
FIGS. 2a and 2b, as described above are perspective and section views of a planar magnetic structure using conventional horizontal windings to implement the CDR.
Figure 2B:
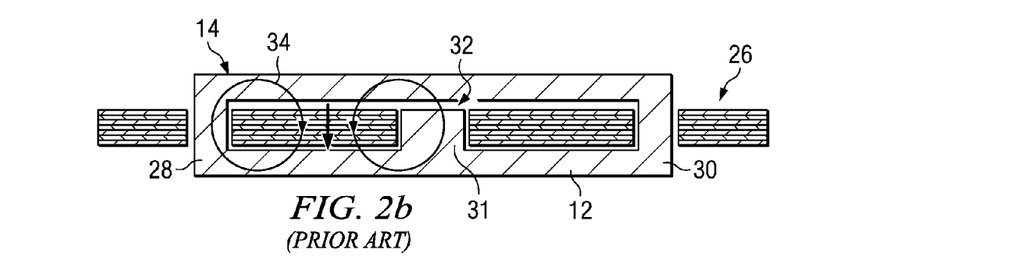

As shown in FIGS. 2a and 2b, integrated magnetics 10 is implemented with a multi-layer printed circuit board (PCB) 26 having copper traces that form the various "horizontal" windings in the plane of the PCB. Horizontal windings refer to the configuration in which the winding is oriented parallel to the core plate. In one embodiment, E-core 12 is positioned underneath the PCB so that its outer legs 28 and 30 extend through holes in the PCB that coincide with the centers of primary and secondary windings 16 and 20 and 18 and 22, respectively, and its center leg 31 extends through a hole that coincides with inductor winding 24. Plate 14 rests on the outer legs forming air gap 32 with the center leg. In another embodiment, the E-I core is attached to the circuit board and the winding terminations are attached to the circuit board traces to complete the circuit.

The coupling between the windings in the planar PCB-based magnetic structure is very strong due to their large overlapping surface areas. Tight coupling between the transformer primary and secondary windings is desirable because it minimizes leakage inductance. However, the large inter-winding capacitance between the outer-leg windings (16, 20, 18 and 22) and the center-leg inductor winding 24 may provide a low-impedance path from the integrated magnetic windings directly to the output of the converter, making the inductor windings ineffective in attenuating high-frequency noises and ripple.

Figure 3:
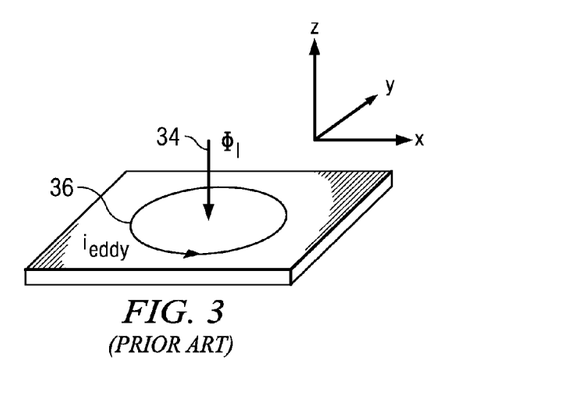
FIG. 3, as described above, is a diagram illustrating the eddy current induced in a horizontal winding by the fringing field from the air gap or leakage field in the window.

Another potential disadvantage of a conventional planar winding design for integrated magnetics is the large number of layers in the PCB needed to accommodate all the windings. The integrated magnetics 10 shown in FIGS. 1 and 2 uses eight PCB layers: 2 for the primary with windings connected in series, 3 for the secondary with windings connected in parallel, and two inductor windings around the center-leg. One layer is used as a ground plane. More layers are desirable from an efficiency standpoint but will be more expensive and the capacitance between the center-leg winding and the outer leg windings will increase dramatically. Furthermore, as more layers are used and the thickness of the PCB increases, some of the winding layers will inevitably be close to air gap 32 where they will suffer from high eddy current losses due to the strong fringing flux surrounding the air gap. As shown in FIG. 3, the flux lines 34 are generally perpendicular to the plane of the horizontal windings in most of the window area of the magnetic core and thus induce large eddy currents 36 in the windings. Finally, since the center-leg winding carries the full load current, its resistance and mean length per turn is an important factor in determining the overall efficiency of the converter, especially in high current applications.

SUMMARY OF THE INVENTION

The present invention provides a winding structure for planar integrated magnetics used in switched-mode power converters that maintains close coupling between the different windings but reduces the eddy current losses, lowers the DC winding resistance, reduces the number of layers of the printed circuit board (PCB), and in certain configurations minimizes the capacitive coupling between outer and center-leg windings if one exists. This winding structure can be used in a wide range of magnetic structures for topologies including isolated and non-isolated CDRs, buck converters and boost converters and with other core geometrics besides the E-I core.

The invention is accomplished by replacing at least some of the horizontal windings with vertical windings. The orientation of the vertical windings relative to the fringing field and leakage flux in the window area significantly reduces eddy current losses. No PCB layers are used to form the vertical windings. The parasitic capacitance between vertical windings or vertical-to-horizontal winding is less than the all-horizontal windings configuration.

In one embodiment, a power converter is implemented with a vertical winding or windings wound around one or more legs of a magnetic core. Each winding may form one or more physical or magnetic "turns" around the leg. Some of the legs may be wound with horizontal windings formed on the layers of a PCB. The magnetic core may be, for example, an E-I core or a matrix integrated magnetics (MIM) core or other core geometries. The core and windings may be configured to couple power in either the horizontal or vertical directions.

In another embodiment, a power converter for a switched-mode power supply is implemented with a multi-layer PCB having a split-primary winding and secondary windings formed thereon. A magnetic core is positioned below the PCB with its outer and center legs extending through holes in the PCB. A magnetic plate is disposed on the outer legs. The split-primary and secondary windings are wound around the outer legs. A vertical inductor winding is wound around the center leg. In many applications the vertical winding will form a single physical and magnetic turn. This approach combines the cost effectiveness of using horizontal windings for the split-primary and secondary with the performance advantages of a vertical center leg winding.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a "vertical" winding structure for planar magnetics used in switched-mode power converters that maintains close coupling between the different windings but reduces the eddy current losses, lowers the winding resistance, reduces the number of layers of the PCB, and in certain configurations reduces the capacitive coupling between the outer-leg windings and the center-leg windings, if one exists, of a magnetic core. This winding structure can be used in a wide range of magnetic structures including isolated and non-isolated CDRs, interleaved CDRs, and buck and boost converters. To maintain continuity, the vertical winding structure will be described in conjunction with a conventional E-I core for an isolated CDR.

Figure 4:
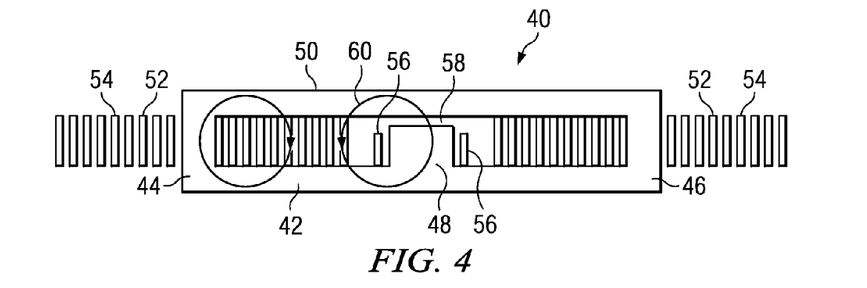
FIG. 4 is a section view of a planar magnetic structure with all-vertical windings in accordance with the present invention.

As shown in FIG. 4, the magnetic structure 40 for use with an isolated CDR includes an E-I core 42 having outer legs 44 and 46 and a center leg 48 and a plate 50. The split-primary and secondary windings are formed by interleaving primary and secondary vertical conductors 52 and 54 around outer legs 44 and 46 that integrate the functions of a transformer and inductor into a single magnetic core. An additional inductor winding is fanned with a vertical conductor 56 around center leg 48. The vertical conductors may be formed from, for example, a copper foil. Typically, the primary conductors 52 will have multiple physical turns that are connected in series to provide multiple magnetic turns. The secondary conductors 54 will also have multiple physical turns but will be connected in parallel to provide a single magnetic turn with reduced resistance. The primary and secondary windings are typically arranged alternately to provide interleaving and field cancellation. The center leg conductor 56 typically has a single physical and magnetic turn. Other configurations are possible.

In this particular embodiment, a conventional air gap 58 is formed between the center leg 48 and plate 50 to prevent saturation of the core. As is described in a copending patent application entitled "Composite Magnetic Core for Switch-Mode Power Converters," filed on Aug. 19, 2004, the air gap may be eliminated by forming a portion of the core out of a high saturation flux density material and the remainder of the core out of a high permeability material such as ferrite. Although elimination of the air gap reduces the fringing fields, the use of vertical windings is still advantageous. Furthermore, the magnetic core may be configured to couple power vertically rather than the traditional horizontal package in which the parasitics due to resistance and inductance are high. These parasitics severely limit the switched mode power converter performance at high frequencies (>1 MHz). As described in copending patent application entitled "Vertically Packaged Switched-Mode Power Converter," filed on Aug. 19, 2004, vertical windings are a key component.

The vertical winding structure on the outer legs maintains a close coupling between the different windings that is required to minimize the leakage inductance of the transformer. As stated previously, the vertical winding structure offers several advantages. Most obviously, it eliminates the need for some or all of the PCB layers used to implement the horizontal windings. This increases the design space for using the available PCB layers.

Figure 5:
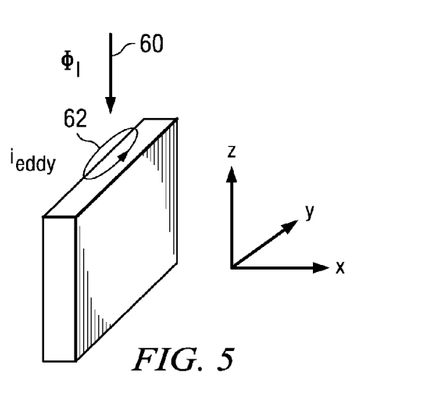
FIG. 5 is a diagram illustrating the reduced eddy current induced in a vertical winding by the fringing or leakage field.

Furthermore, as shown in. FIG. 5, the magnetic flux or field 60 from the fringing field or leakage field in the core window area induces a much lower eddy current 62 in the vertical winding compared to that of a horizontal winding in either to center or outer legs. This is due to the favorable orientation of the vertical winding in the magnetic field within the window area of the core. The flux lines in the window area of a planar magnetic core are mostly vertical, i.e., along the z axis. Since they are perpendicular to the plane of the horizontal winding, they induce large eddy currents. Conversely, the flux lines are parallel to the plane of the vertical winding. As such, the Induced eddy current 62 in the vertical winding is confined to the small cross-sectional area and therefore the eddy current losses are much lower. It is important to note that in the immediate vicinity of the air gap the field has both a horizontal and a vertical component The horizontal component would cause substantial eddy current loss in the vertical winding since it is induced in the planar direction of the winding. These losses are avoided by lowering the winding height and spacing it a sufficient distance away from the air gap to avoid the horizontal portion of the fringing field from impinging on the face of the vertical winding. In this area, the field is mostly parallel to the winding and hence the eddy current losses are reduced. For example, the top of the vertical winding should be at least five times to air gap length from the air gap region.

Figure 6:
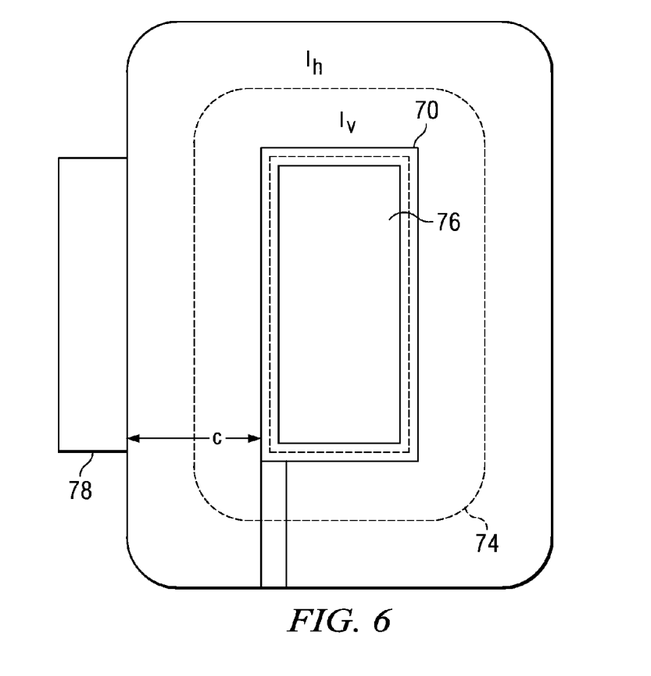
FIG. 6 is a diagram comparing the turn lengths of vertical and horizontal windings.

Since the vertical winding is formed by separate copper foils, its thickness will not be limited by PCB technologies and much thicker copper foils can be used. This is advantageous from the efficiency viewpoint, especially in applications where a low voltage and high current is to be delivered to the load. The center-leg winding carries the full load current and lowering its dc resistance by increasing its thickness without encountering eddy current losses increases efficiency. Furthermore, as shown in FIG. 6, the avenge length $I_v$ of a single turn vertical winding 70 is much shorter than the average length $I_h$ of a corresponding horizontal winding 74 wound around the center leg 76 of a standard E-core 78. $I_v$ is only slightly longer than the perimeter of the center leg. For typical values of the width c of the core window area, the width and thickness of the copper traces and the thickness of the foil, the DC resistance of the vertical winding may be only one third of that of the horizontal winding.

Figure 7:
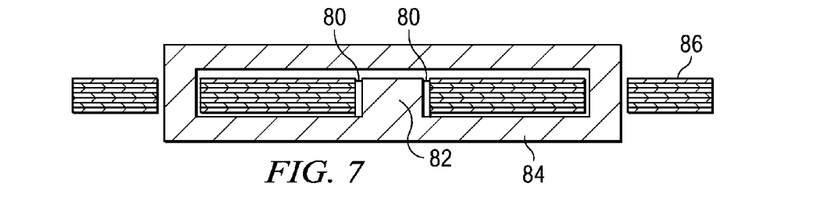
FIG. 7 is a section view of the E-I core including a single-turn vertical inductor winding around the center leg and conventional horizontal primary and secondary windings around the outer legs for the CDR.

As shown in FIG. 7, a conventional PCB-based winding design can be improved by replacing the horizontal center-leg inductor windings with a vertical winding 80 around the center leg 82 of an E-I core 84. This magnetic structure realizes the cost advantage of the known PCB technology and the performance advantages of the vertical winding configuration. Furthermore, the parasitic capacitive coupling between the horizontal windings 86 and the vertical center-leg inductor winding 80 is greatly reduced. Finite element analysis has indicated that the parasitic capacitance can be reduced to 10% of the value when all windings are horizontal, which makes the center-leg inductor winding more effective in attenuating high-frequency noise and ripple, and increases efficiency.

Figure 8A:
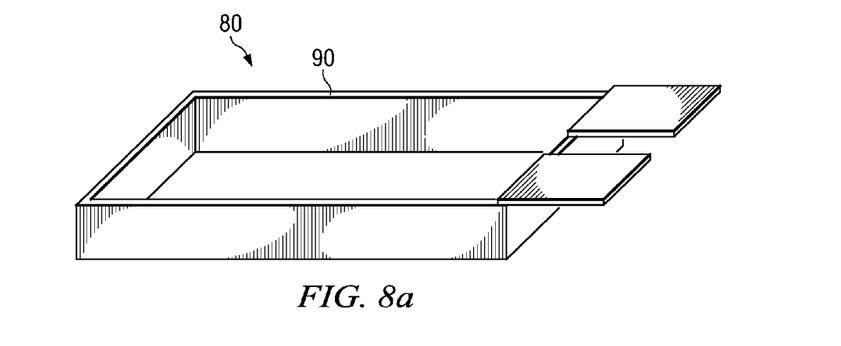
FIGS. 8a through 8c are a sequence of diagrams illustrating the assembly of the magnetic structure.
Figure 8B:
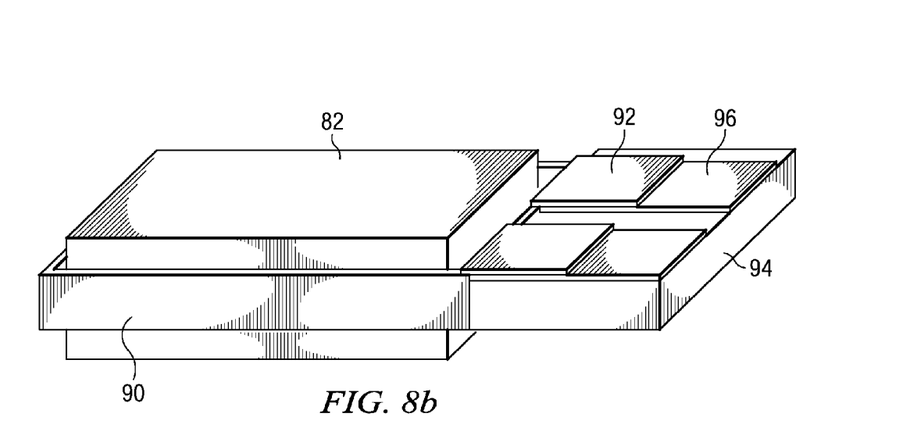
Figure 8C:
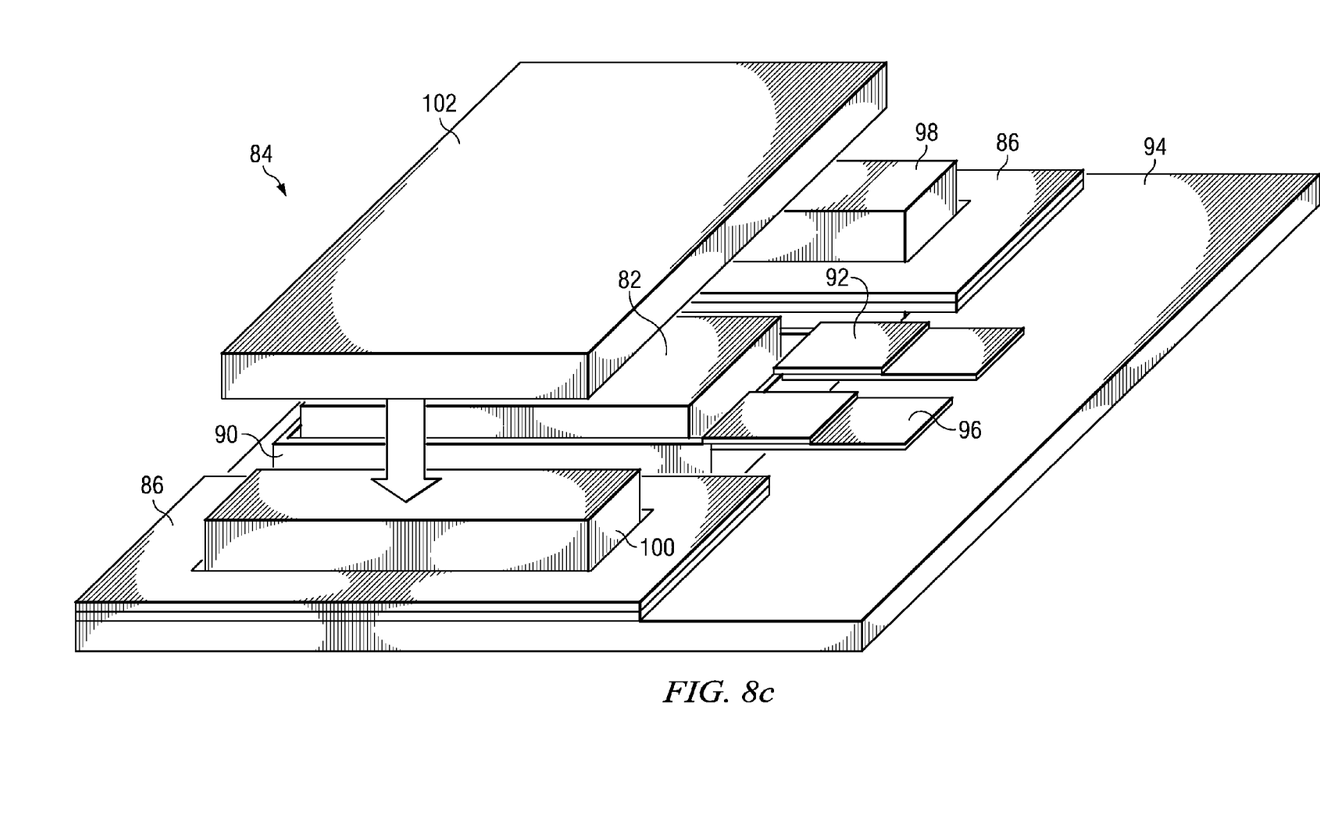

As shown in FIGS. 8a and 8b, the vertical winding 80 is implemented by winding a piece of copper foil or copper stamping 90 around the center leg 82 of the E-core 84. The foil is folded to form winding terminations 92 in the horizontal plane of the PCB 94 for connection via traces 96 to other parts of the circuit on the PCB. As shown in FIG. 8c, the center leg 82 and outer legs 98 and 100 of E-I core 84 are inserted through respective openings in the PCB 94 on which is formed the horizontal windings 86 for the primary and secondary of the integrated magnetics. The hole for the center leg is made slightly larger than normal to accommodate the vertical winding. The copper foil or copper stamping 90 is wound around the center leg and a magnetic plate 102 is mounted on the outer legs.

Figure 1:
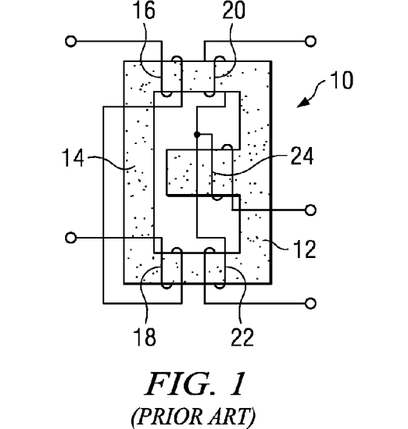
FIG. 1, as described above, is a winding diagram of a standard E-I core for use in a current-doubler rectifier (CDR)

The proposed winding structure was validated by prototype designs for a half-bridge converter using the integrated magnetics shown in FIG. 1. The converter was designed to operate with an input voltage $V_{in}$=48 V, an output voltage $V_{out}$=3.3 V, and a rated output power=100 W. The integrated magnetics was built using a planar E-I 22 core with a matching plate. Numbers of magnetic turns of the windings were: primary winding $N_p$=2, secondary winding $N_s$=1, center-leg winding $N_c$=1. Two prototypes were developed, one using a conventional PCB-based design with exclusively horizontal windings and one with a vertical center-leg inductor winding. The windings were constructed as follows:

1. Two PCB layers were used in each prototype for the primary windings. Each layer contains a single turn around each of the outer legs, and the two turns are connected in series.
2. The secondary windings are also formed by three PCB layers. Since only one turn is required for the secondary, the three layers are connected in parallel to lower the dc resistance.
3. The horizontal center-leg winding occupies additional layers of the PCB, wherein the number of layers is dependent on the thickness of the center-leg winding. Each layer contains a single turn around the center leg of the core, and the layers are connected in parallel to form the single-turn center-leg winding.
4. The vertical center-leg winding in the prototype in accordance with the invention is made from a 16 mil copper foil wound around the center leg. The PCB for this prototype has two less layers compared to the other prototype due to the elimination of the horizontal center-leg winding.

As expected, the prototype with a vertical center-leg winding is more efficient than the conventional design, by roughly 0.5-1.25%. The efficiency difference increases with output power confirming that the efficiency improvement is due to the lower losses of the vertical winding. Using the vertical center-leg winding architecture, we calculate an efficiency improvement of about 4% if the output current is doubled.

Figure 9A:
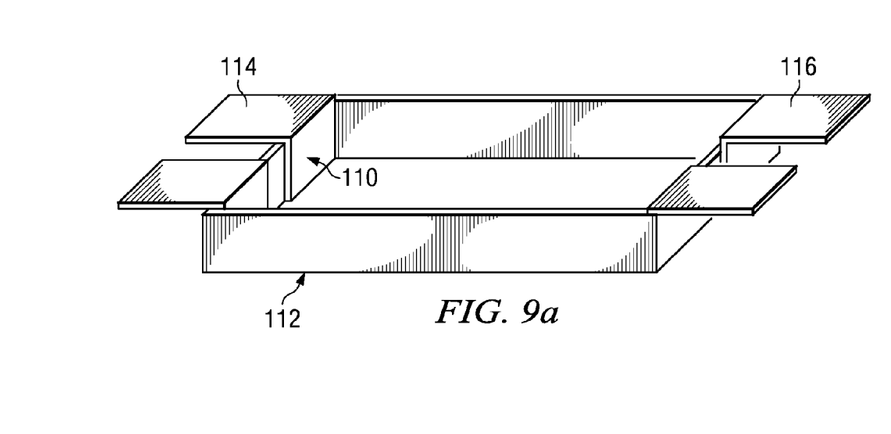
FIGS. 9a through 9c are diagrams of a vertical winding design to achieve coupling between a set of primary and secondary windings for the outer legs of a core.
Figure 9B:
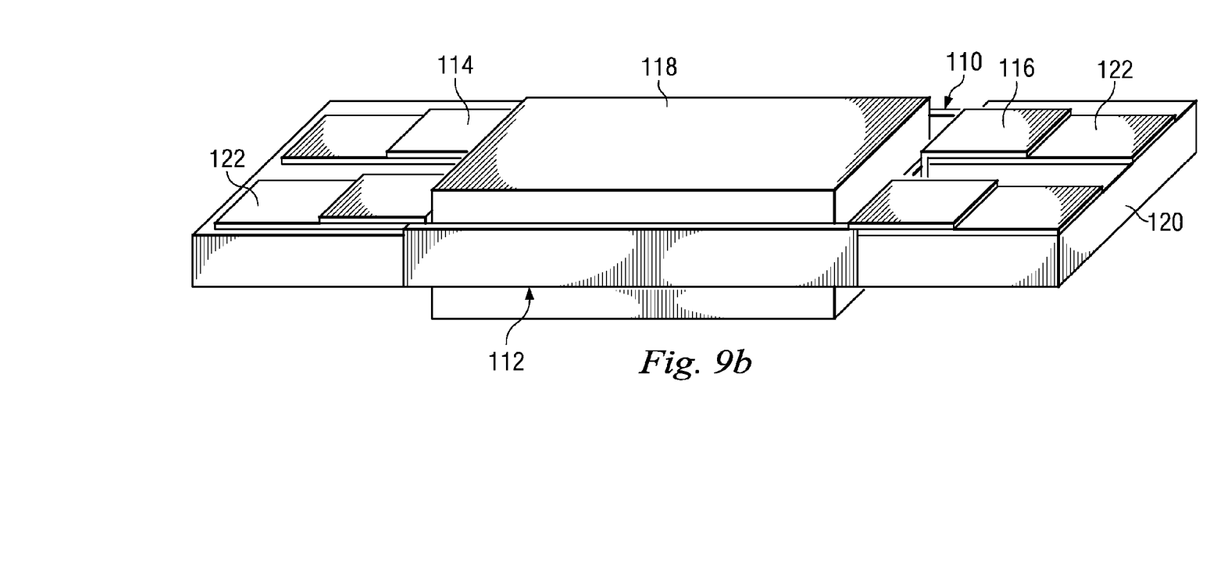
Figure 9C:
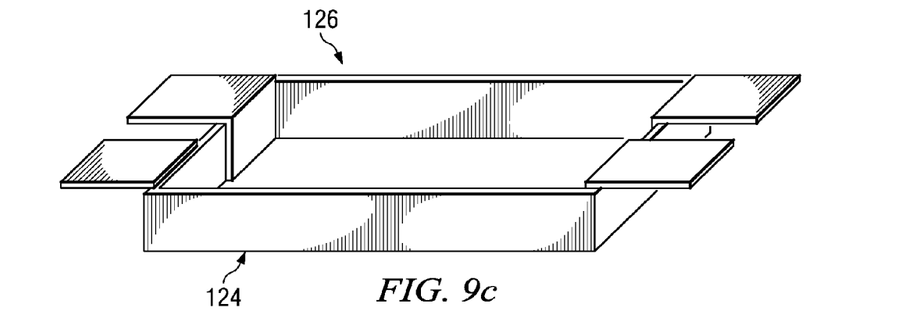

If the vertical winding is also used to provide the outer leg windings, it becomes necessary to provide a winding design that (a) achieves close magnetic coupling between the primary and secondary windings and (b) can be extended to form an n:1 turn transformer. FIGS. 9a and 9b illustrate a vertical winding design to achieve close coupling between a vertical winding 110 and another vertical winding 112, which, for example, may represent a primary and a secondary winding. The windings are formed one inside the other to provide interleaving of the fields generated by the primary and secondary windings. The windings are terminated in winding terminations 114 and 116 at opposite ends of an outer leg 118. The winding terminations are formed in the plane of the PCB 120 for connection to other windings or circuits via traces 122. FIG. 9c illustrates a modified 1:1 turn design in which the vertical windings 124 and 126 are woven together. Since the winding terminations are made externally in FIGS. 9a and 9c, an n:1 arrangement of primary to secondary windings can be achieved by connecting the end of one primary turn to the start of the second primary turn on the P0. Since the required secondary turn is usually a single turn, all starts of the secondary can be connected together (and similarly for the ends) on the PCB, while maintaining an interleaved or alternate arrangement of primary and secondary turns.

Figure 10A:
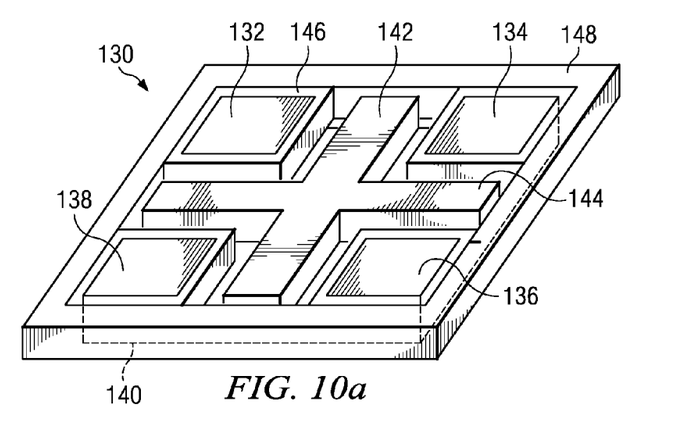
FIGS. 10a and 10b are alternate matrix integrated magnetics (MIM) core structures including vertical windings.
Figure 10B:
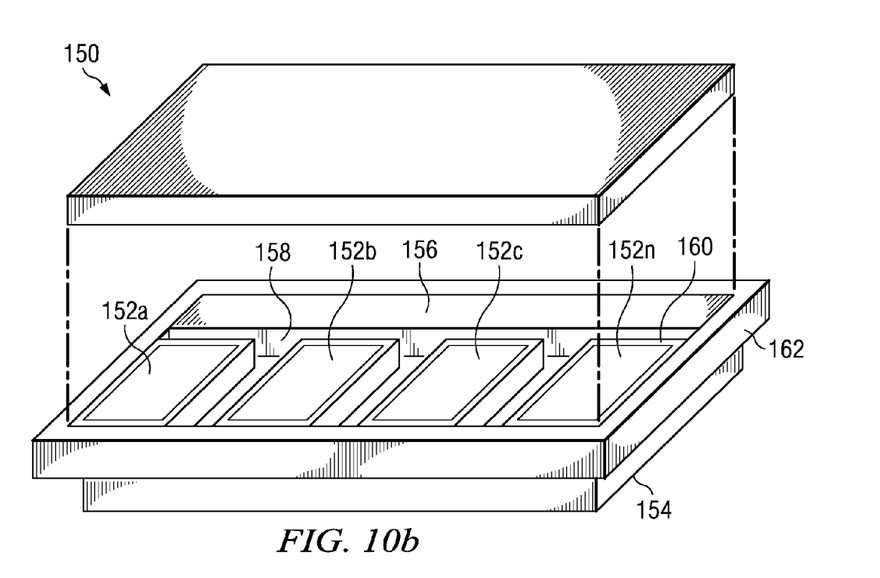

Although the implementations of the vertical winding design have only been described in the context of a conventional E-I core design, the principles are equally applicable to other magnetic core configurations, namely new matrix Integrated magnetics (MIM) cores of the type shown in FIGS. 10a and 10b or other standard core geometries such as PQ or RM cores. The MIM core 130, which is described in detail in copending US Patent application "Core, Structure," filed Apr. 18, 2002, provides four outer legs 132, 134, 136 and 138 at the corners of a base 140. A shared center leg 142 formed in the shape of a cross or "+" is formed at the center of the base. The shape of the shared center-leg core may also be circular and is not restricted to the "+" sign. Similarly, the outer legs may also be circular. As shown, a vertical winding 144 is formed around the center leg 142. Horizontal windings 146 are formed in a multilayer PCB 148 fix each of the outer legs. A plate (not shown) is placed on the outer legs. This configuration combines the benefits of the MIM core and the vertical winding. Another MIM core 150, as described in copending US Patent application "Extended E Matrix Integrated Magnetics (MIM) Core" filed Aug. 19, 2004, comprises a plurality of outer legs 152a, 152b, . . . 152n along an outer edge of a base 154. A shared center leg 156 is disposed along the opposite outer edge of the base. As shown, a vertical winding 158 is formed around the center leg 156. Horizontal windings 160 are formed in a multilayer PCB 162 for each of the outer legs. This "Extended E" configuration offers all the benefits of the cross-shaped core while providing ease and simplicity of manufacturing, provides a shorter turn length around the center leg and can be extended to any reasonable number of outer legs.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A power converter, comprising:
    a magnetic core having a base, first, center and second legs on said base, and a plate opposite said base, said center leg having an air gap therein;
    a vertical winding around said center leg and spaced away from said air gap; and
    first and second windings around said first and second legs, respectively, wherein at least one of said first and second windings has a different number of turns from a number of turns of said vertical winding.

2. The power convener as recited in claim 1 wherein said vertical winding is approximately orthogonal to said base and said plate and approximately parallel to said center leg.

3. The power converter as recited in claim 1 wherein said vertical winding is substantially magnetically independent from said first and second windings.

4. The power converter as recited in claim 1 wherein said vertical winding makes a single physical and magnetic turn.

5. The power converter as recited in claim 1 wherein said vertical winding is spaced away from said air gap in said center leg by a distance of at least five times a length of said air gap.

6. The power converter as recited in claim 1 wherein said first and second windings are horizontal windings.

7. The power converter as recited in claim 1 wherein said first and second windings comprise metal traces formed on a multi-layered printed circuit board (PCB).

8. The power converter as recited in claim 1 further comprising a third winding around said first leg and a fourth winding around said second leg.

9. The power convener as recited in claim 1 wherein said vertical winding is thicker than said first and second windings.

10. The power converter as recited in claim 1 wherein said first and second windings are vertical windings.

11. The power converter as recited in claim 10 further comprising third and fourth vertical windings around said first and second legs, respectively, said first and third vertical windings and said second and fourth vertical windings being formed one inside another around each said leg and connected to define closely coupled split-primary windings and secondary windings.

12. The power converter as recited in claim 11 wherein said first and third vertical windings and said second and fourth vertical windings each form multiple physical turns, said first and third winding turns each being connected in series to define a multiple magnetic turn split-primary winding, said second and fourth winding turns each being connected in series to define a single magnetic turn secondary winding with reduced resistance.

13. The power convener as recited in claim 1 wherein a leakage field in a window area of said magnetic core is approximately near a top of said center leg towards said plate and approximately vertical moving away therefrom, said vertical winding being spaced away from said center leg and lowered with respect to said plate to reduce interaction of said vertical winding with a horizontal component of said leakage field and be approximately aligned with a vertical component of said leakage field.

14. The power converter as recited in claim 13 wherein said horizontal component of said leakage field is created adjacent to said air gap located between said center leg and said plate or a material discontinuity at an interface thereof.

15. The power converter as recited in claim 1 wherein said magnetic core is an E-I core.

16. The power converter as recited in claim 1 further comprising third and fourth legs, said first, second, third and fourth legs disposed at opposite corners of a rectangular base to define windows therebetween, said center leg disposed at a center of said rectangular base and extending in a plus shape into said windows and separated from said first, second, third and fourth legs, said plate disposed on said first, second, third and fourth legs.

17. The power converter as recited in claim 16 wherein said air gap is formed between said center leg and said plate.

18. The power converter as recited in claim 16 wherein said plate is disposed on said center leg, a portion of said center leg being formed of a high saturation flux density material.

19. The power converter recited in claim 1 further comprising a third leg, said first, second and third legs separated along a first outer edge of said base to define first and second windows therebetween, said center leg disposed along a second outer edge of said base and separated from said first, second and third legs to define a center window, said plate disposed on said first, second and third legs.

* * * * *

UNITED STATES PATENT AND TRADEMARK OFFICE
CERTIFICATE OF CORRECTION

PATENT NO. : 7,321,283 B2
APPLICATION NO. : 10/922066
DATED : January 22, 2008
INVENTOR(S) : Mehrotra et al.

It is certified that error appears in the above-identified patent and that said Letters Patent is hereby corrected as shown below:

On the Title Page, Section (56) References Cited, U.S. PATENT DOCUMENTS, Page 2, Col. 2, 30th entry, delete "er" and insert --et--.
On the Title Page, Section (56) References Cited, OTHER PUBLICATIONS, Page 2, Col. 2, 2nd entry, delete "Chandrasekaran" and insert --Brar--.
On the Title Page, Section (56) References Cited, OTHER PUBLICATIONS, Page 3, Col. 1, 2nd entry, 1st line, delete "oh" and insert --of--.
On the Title Page, Section (56) References Cited, OTHER PUBLICATIONS, Page 3, Col. 2, last entry, 1st line, delete "Invetigation" and insert --Investigation--.
In Col. 3, line 61, delete "fanned" and insert --formed--.
In Col. 4, line 36, delete "to center" and insert --the center--.
In Col. 4, line 43, delete "Induced" and insert --induced--.
In Col. 6, line 31, delete "P0" and insert --PCB--.
In Col. 6, line 40, delete "Integrated" and insert --integrated--.
In Col. 6, line 43, delete ""Core," and insert --"Core--.
In Col. 6, line 52, delete "fix" and insert --for--.
In Col. 7, line 19, delete "convener" and insert --converter--.
In Col. 7, line 39, delete "convener" and insert --converter--.
In Col. 8, line 10, delete "convener" and insert --converter--.
In Col. 8, line 41, after converter insert --as--.

Signed and Sealed this

Twelfth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,321,283 B2 Page 1 of 1
APPLICATION NO. : 10/922066
DATED : January 22, 2008
INVENTOR(S) : Mehrotra et al.

It is certified that error appears in the above-identified patent and that said Letters Patent is hereby corrected as shown below:

On the Title Page, Item (56) References Cited, U.S. PATENT DOCUMENTS, Page 2, Col. 2, 2nd entry, delete "5/2002" and insert --3/2002--.

Signed and Sealed this

Twentieth Day of April, 2010

David J. Kappos
*Director of the United States Patent and Trademark Office*